(12) United States Patent
Hashimoto et al.

(10) Patent No.: US 11,469,046 B2
(45) Date of Patent: Oct. 11, 2022

(54) MULTILAYER CERAMIC ELECTRONIC COMPONENT

(71) Applicant: Murata Manufacturing Co., Ltd., Nagaokakyo (JP)

(72) Inventors: Hideyuki Hashimoto, Nagaokakyo (JP); Kenji Ueno, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 17/188,081

(22) Filed: Mar. 1, 2021

(65) Prior Publication Data

US 2021/0304965 A1 Sep. 30, 2021

(30) Foreign Application Priority Data

Mar. 24, 2020 (JP) .............................. JP2020-052459

(51) Int. Cl.
*H01G 4/12* (2006.01)
*H01G 4/30* (2006.01)

(52) U.S. Cl.
CPC ............. *H01G 4/1227* (2013.01); *H01G 4/30* (2013.01)

(58) Field of Classification Search
None
See application file for complete search history.

(56) References Cited

U.S. PATENT DOCUMENTS

| | | | |
|---|---|---|---|
| 8,507,395 B2* | 8/2013 | Murakawa | H01G 4/1227 428/701 |
| 9,799,450 B2* | 10/2017 | Oguni | H01G 4/30 |
| 10,147,546 B2 | 12/2018 | Morita | |
| 10,991,510 B2* | 4/2021 | Takahashi | H01G 4/1227 |
| 11,257,627 B2* | 2/2022 | Uchida | H01G 4/1227 |
| 2004/0105214 A1* | 6/2004 | Nakamura | H01G 4/1227 361/321.2 |
| 2006/0087796 A1* | 4/2006 | Yamazaki | C04B 35/4682 361/321.2 |
| 2007/0135295 A1* | 6/2007 | Sasabayashi | H01G 4/30 501/138 |
| 2008/0226944 A1* | 9/2008 | Aman | C04B 35/62645 501/138 |
| 2012/0050941 A1* | 3/2012 | Murakawa | C04B 35/4682 361/321.1 |
| 2016/0049254 A1* | 2/2016 | Sugita | H01G 4/1218 361/301.4 |

(Continued)

FOREIGN PATENT DOCUMENTS

| | | | | |
|---|---|---|---|---|
| JP | WO2015040881 A1 * | 3/2015 | | |
| JP | 2017178685 A * | 10/2017 | .......... | C01G 25/006 |

(Continued)

*Primary Examiner* — Dion R. Ferguson
(74) *Attorney, Agent, or Firm* — ArentFox Schiff LLP

(57) ABSTRACT

A multilayer ceramic electronic component that includes a multilayer body including a dielectric layer and an internal electrode layer that are layered. The dielectric layer contains a plurality of dielectric particles containing Ba and Ti. The plurality of dielectric particles contain a first concentrated region containing a first element and located at an interface with an adjacent dielectric particle of the plurality of dielectric particles, and a second concentrated region containing the first element and present at an interface within 50 nm from the first concentrated region.

16 Claims, 2 Drawing Sheets

SCHEMATIC DIAGRAM OF EDX OBSERVATION IMAGE IN CENTRAL REGION IN FIG. 2

(56) References Cited

U.S. PATENT DOCUMENTS

| | | | | |
|---|---|---|---|---|
| 2016/0196919 A1* | 7/2016 | Oguni | ............... | C04B 35/6261 |
| | | | | 361/301.4 |
| 2017/0032895 A1* | 2/2017 | Ogata | ............... | H01G 4/1227 |
| 2017/0365410 A1* | 12/2017 | Morita | ............... | H01G 4/2325 |
| 2019/0304688 A1* | 10/2019 | Takahashi | ............ | C04B 35/465 |
| 2020/0105470 A1* | 4/2020 | Araki | ............... | H01G 4/30 |
| 2020/0411242 A1* | 12/2020 | Hashimoto | ......... | H01G 4/1227 |
| 2021/0020376 A1* | 1/2021 | Sasabayashi | .... | C04B 35/62823 |
| 2021/0304965 A1* | 9/2021 | Hashimoto | ......... | H01G 4/1227 |

FOREIGN PATENT DOCUMENTS

| | | | | | |
|---|---|---|---|---|---|
| JP | 2017228590 A | | 12/2017 | | |
| JP | 2021009995 A | * | 1/2021 | ......... | C04B 35/4682 |
| KR | 101376924 B1 | * | 3/2014 | | |
| KR | 20210100952 A | * | 8/2021 | | |
| WO | WO-2013089269 A1 | * | 6/2013 | .......... | H01G 4/1227 |
| WO | WO-2014148373 A1 | * | 9/2014 | ............ | H01G 4/012 |
| WO | WO-2015040881 A1 | * | 3/2015 | ............ | B32B 18/00 |

\* cited by examiner

SCHEMATIC DIAGRAM OF TEM OBSERVATION IMAGE IN CENTRAL REGION IN FIG. 2

SCHEMATIC DIAGRAM OF EDX OBSERVATION IMAGE IN CENTRAL REGION IN FIG. 2

MULTILAYER CERAMIC ELECTRONIC COMPONENT

CROSS REFERENCE TO RELATED APPLICATIONS

The present application claims priority to Japanese Patent Application No. 2020-052459, filed Mar. 24, 2020, the entire contents of which are incorporated herein by reference.

BACKGROUND OF THE INVENTION

Field of the Invention

This disclosure relates to a multilayer ceramic electronic component.

Description of the Background Art

A multilayer ceramic electronic component, such as a multilayer ceramic capacitor, has recently been increasingly applied to an electronic device such as a vehicle-mounted device that is required to have high reliability.

A multilayer ceramic capacitor described in Japanese Patent Laid-Open No. 2017-228590 represents one example of such a multilayer ceramic electronic component. The multilayer ceramic capacitor described in Japanese Patent Laid-Open No. 2017-228590 includes a dielectric layer containing a ceramic material and Ni, and an internal electrode layer containing Ni.

An insulating resistance at the time of application of a high electric field to the dielectric layer of a multilayer ceramic capacitor, as in a high-temperature load test, tends to be dominated by grain boundaries of dielectric particles that form the dielectric layer. Japanese Patent Laid-Open No. 2017-228590 discloses a technique to suppress variation in insulating resistance by taking into dielectric particles, Ni that is diffused from the internal electrode layer and non-uniformly present at the grain boundaries.

SUMMARY OF THE INVENTION

In order to improve reliability of the multilayer ceramic capacitor including the dielectric layer containing $BaTiO_3$, in addition to Ni diffused from the internal electrode layer into the dielectric particles, migration of an oxygen vacancy in the dielectric layer at the time of application of a direct-current (DC) voltage should be suppressed. In order to improve reliability, $Ba^{2+}$ which is a positive divalent ion of Ba in a crystal lattice of $BaTiO_3$ is allegedly effectively substituted with $RE^{3+}$ which is a positive trivalent ion of a rare earth element RE (a denotation of an ion may hereinafter follow the above denotation).

When $Ba^{2+}$ is substituted with $RE^{3+}$ as above, positive charges become excessive. Therefore, Ba vacancy regarded as being relatively negatively divalently charged is produced to satisfy an electrically neutral condition. This Ba vacancy and oxygen vacancy that can be regarded as being relatively positively divalently charged form a stable defect pair. Since Ba vacancy is less likely to migrate in spite of application of a DC voltage, migration of the oxygen vacancy is suppressed by the oxygen vacancy being retained by the Ba vacancy.

It has been known that migration of the oxygen vacancy is suppressed by a structure in the vicinity of a grain boundary of a dielectric particle. For example, calculation of a stable structure of a corresponding grain boundary of a dielectric containing $BaTiO_3$ with the use of lattice statics shows that many positions stable for the oxygen vacancy are present in the vicinity of the grain boundary. The presence of the Ba vacancy owing to substitution of $Ba^{2+}$ with $RE^{3+}$ is an important factor in stability of the oxygen vacancy in the vicinity of the grain boundary.

In order to improve reliability of the multilayer ceramic capacitor including the dielectric layer containing $BaTiO_3$, migration of the oxygen vacancy within crystal grains that form the dielectric layer should be suppressed. Japanese Patent Laid-Open No. 2017-228590, however, is silent about this aspect.

A multilayer ceramic electronic component according to this disclosure includes a multilayer body including a dielectric layer and an internal electrode layer that are layered. The dielectric layer contains a plurality of dielectric particles containing Ba and Ti. The plurality of dielectric particles contain a first concentrated region containing a first element and located at an interface with an adjacent dielectric particle of the plurality of dielectric particles, and a second concentrated region containing the first element and present at an interface within 50 nm from the first concentrated region.

By arranging an element capable of suppressing migration of oxygen vacancy at the interface, the multilayer ceramic electronic component can achieve high reliability.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
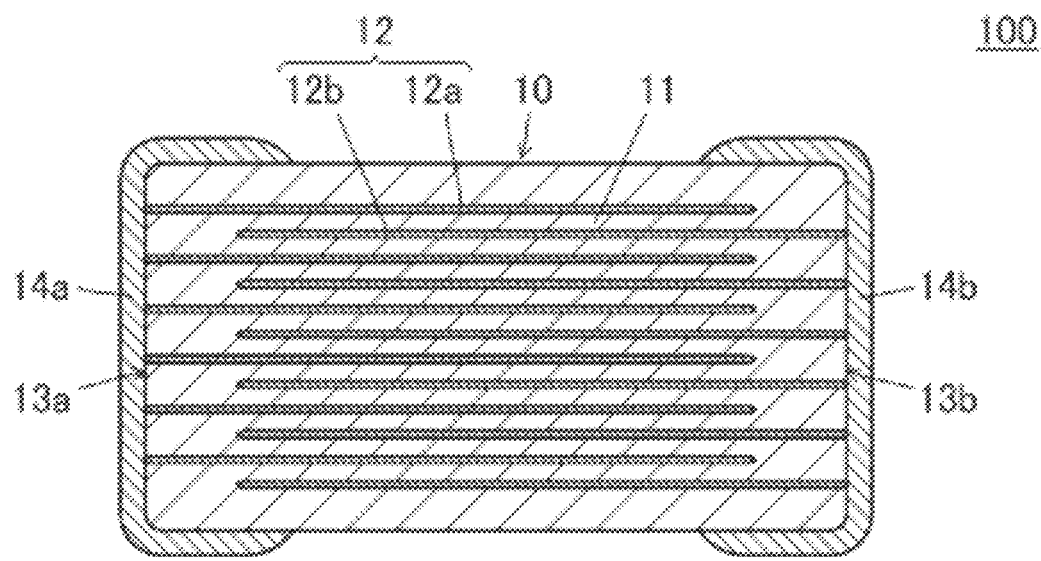
FIG. 1 is a cross-sectional view of a multilayer ceramic capacitor 100 representing a first embodiment of a multilayer ceramic electronic component according to this disclosure.

Features of this disclosure will be described with reference to the drawings. The same or common elements in an embodiment of a multilayer ceramic electronic component shown below have the same reference characters allotted in the drawings and description thereof may not be repeated.

A multilayer ceramic capacitor 100 representing a configuration of an example of the multilayer ceramic electronic component according to this disclosure will be described with reference to FIGS. 1 to 4.

<Structure of Multilayer Ceramic Capacitor>

FIG. 1 is a cross-sectional view of multilayer ceramic capacitor 100. Multilayer ceramic capacitor 100 includes a multilayer body 10. Multilayer body 10 includes a plurality of dielectric layers 11 and a plurality of internal electrode layers 12 that are alternately layered. The plurality of dielectric layers 11 include an outer layer portion and an inner layer portion. The outer layer portion is arranged between a first main surface of multilayer body 10 and internal electrode layer 12 closest to the first main surface and between a second main surface and internal electrode layer 12 closest to the second main surface. The inner layer portion is arranged in a region lying between the two outer layer portions.

The plurality of internal electrode layers 12 include a first internal electrode layer 12a and a second internal electrode layer 12b. Multilayer body 10 includes the first main surface and the second main surface opposed to each other in a layering direction, a first side surface and a second side surface opposed to each other in a width direction orthogonal to the layering direction, and a first end surface 13a and a second end surface 13b opposed to each other in a length direction orthogonal to the layering direction and the width direction.

As will be described later, dielectric layer 11 contains a plurality of dielectric particles that contain as a compound, a $BaTiO_3$-based perovskite compound, and contain as an element, a first element M1 which is a rare earth element RE.

Examples of a dielectric material include a material resulting from substitution of some of $Ba^{2+}$ in crystal lattices of the $BaTiO_3$-based perovskite compound with $RE^{3+}$. Examples of rare earth element RE can include Nd, Sm, Eu, Gd, Tb, Dy, Ho, Er, Tm, and Yb. Examples of the $BaTiO_3$-based perovskite compound include $BaTiO_3$ and a material resulting from substitution of at least one of $Ba^{2+}$ and $Ti^{4+}$ of $BaTiO_3$ with other ions such as $Ca^{2+}$ and $Zr^{4+}$. Such materials may collectively be called a $BaTiO_3$-based dielectric material below.

First internal electrode layer 12a includes an opposing electrode portion opposed to second internal electrode layer 12b with dielectric layer 11 being interposed and a drawn electrode portion from the opposing electrode portion to first end surface 13a of multilayer body 10. Second internal electrode layer 12b includes an opposing electrode portion opposed to first internal electrode layer 12a with dielectric layer 11 being interposed and a drawn electrode portion from the opposing electrode portion to second end surface 13b of multilayer body 10.

One capacitor is formed by first internal electrode layer 12a and second internal electrode layer 12b opposed to each other with dielectric layer 11 being interposed. Multilayer ceramic capacitor 100 is concluded as a plurality of capacitors being connected in parallel through a first external electrode 14a and a second external electrode 14b which will be described later.

At least a second element selected from among Ni, Cu, Ag, and Pd as a second element group or an alloy containing that element can be employed as a conductive material that forms internal electrode layer 12. Internal electrode layer 12 may further contain a dielectric substance called a common material as will be described later. The common material is added to an internal electrode layer paste to be used for forming internal electrode layer 12 in order to bring shrinkage-by-sintering characteristics of internal electrode layer 12 closer to those of dielectric layer 11 at the time of firing of multilayer body 10.

Multilayer ceramic capacitor 100 further includes first external electrode 14a and second external electrode 14b. First external electrode 14a is formed on first end surface 13a of multilayer body 10 to electrically be connected to first internal electrode layer 12a and extends from first end surface 13a toward the first and second main surfaces and the first and second side surfaces. Second external electrode 14b is formed on second end surface 13b of multilayer body 10 to electrically be connected to second internal electrode layer 12b and extends from second end surface 13b toward the first and second main surfaces and the first and second side surfaces.

First external electrode 14a and second external electrode 14b each include an underlying electrode layer and a plated layer arranged on the underlying electrode layer. The underlying electrode layer includes at least one selected from a sintered material layer, a conductive resin layer, a metal thin film layer, and a plated layer.

The sintered material layer is made by baking a paste containing metal powders and glass powders, and includes a conductor region and an oxide region. The conductor region contains a metal sintered material obtained by sintering of metal powders. At least one selected from among Ni, Cu, and Ag or an alloy containing that metal can be employed for the metal powders. The oxide region includes a glass component derived from glass powders. A $B_2O_3$—$SiO_2$—BaO-based glass material can be employed for the glass powders. A plurality of sintered material layers different in component may be formed. The sintered material layer may be fired simultaneously with multilayer body 10 or may be baked after firing of multilayer body 10.

The conductive resin layer contains conductive particles such as fine metal particles and a resin portion. At least one selected from among Ni, Cu, and Ag or an alloy containing that metal can be employed as a metal that forms the conductive particles. An epoxy-based thermosetting resin can be employed as a resin that forms the resin portion. A plurality of conductive resin layers different in component may be formed.

The metal thin film layer is a layer having a thickness not larger than 1 μm, the layer being formed by a thin film formation method such as sputtering or vapor deposition to deposit fine metal particles. At least one selected from among Ni, Cu, Ag, and Au or an alloy containing that metal can be employed as a metal that forms the metal thin film layer. A plurality of metal thin film layers different in component may be formed.

The plated layer as an underlying electrode is provided directly on multilayer body 10 and directly connected to the internal electrode layer described previously. At least one selected from among Cu, Ni, Sn, Au, Ag, Pd, and Zn or an alloy containing that metal can be employed for the plated layer. For example, when Ni is employed as the metal that forms internal electrode layer 12, Cu with good bondability to internal electrode layer 12 is preferably employed for the plated layer.

At least one selected from among Ni, Cu, Ag, Au, and Sn or an alloy containing that metal can be employed as the metal that forms the plated layer arranged on the underlying electrode layer. A plurality of plated layers different in component may be formed. Preferably, two layers of an Ni plated layer and an Sn plated layer are formed.

The Ni plated layer is arranged on the underlying electrode layer and it can prevent the underlying electrode layer from being eroded by solder in mounting the multilayer ceramic electronic component on a circuit board with the use of solder. The Sn plated layer is arranged on the Ni plated layer. Since the Sn plated layer is excellent in wettability to solder containing Sn, mountability in mounting the multilayer ceramic electronic component can be improved. These plated layers are not essential.

<Microstructure of Dielectric Layer>

In order to examine a microstructure of a dielectric particle contained in dielectric layer 11 of multilayer ceramic capacitor 100 according to this disclosure, observation with a TEM and element mapping by EDX annexed to the TEM were conducted.

In this examination, a $BaTiO_3$-based dielectric material designed to contain $BaTiO_3$ as a basic structure and to contain a plurality of dielectric particles containing Dy as a first element M1 and other additive elements was employed as a material for dielectric layer 11. Ni was employed as a material for internal electrode layer 12.

Figure 2:
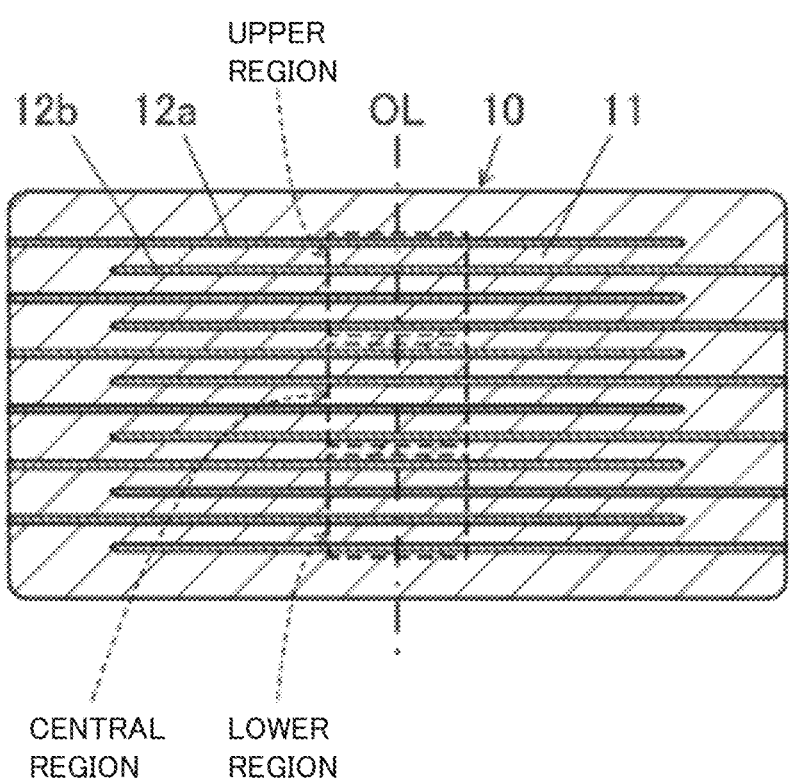
FIG. 2 is a cross-sectional view for illustrating a sample prepared for examining a microstructure of a dielectric layer 11 of multilayer ceramic capacitor 100.

Preparation of a sample for TEM observation and EDX mapping will be described with reference to FIG. 2. FIG. 2 is a cross-sectional view for illustrating a sample prepared for examining a microstructure of dielectric layer 11 of multilayer ceramic capacitor 100.

Multilayer body 10 of multilayer ceramic capacitor 100 was obtained with a manufacturing method which will be described later. A polished body was obtained by polishing multilayer body 10 from a side of the first side surface and a side of the second side surface so as to leave a central portion in the width direction of multilayer body 10. As shown in FIG. 2, a virtual line OL as being orthogonal to internal electrode layer 12 in the vicinity of a central portion in the length direction was assumed. A region involved with obtainment of a capacitance of the polished body where dielectric layer 11, first internal electrode layer 12a, and second internal electrode layer 12b were layered was equally divided into three parts in the layering direction along virtual line OL to define three regions of an upper region, a central region, and a lower region.

Three thin film samples were obtained from respective regions by cutting the upper region, the central region, and the lower region from the polished body and forming each of the regions into a thin film by Ar ion milling or the like. The three thin film samples of the upper region, the central region, and the lower region of multilayer body 10 obtained as above were subjected to TEM observation and element mapping with EDX annexed to the TEM.

Figure 3:
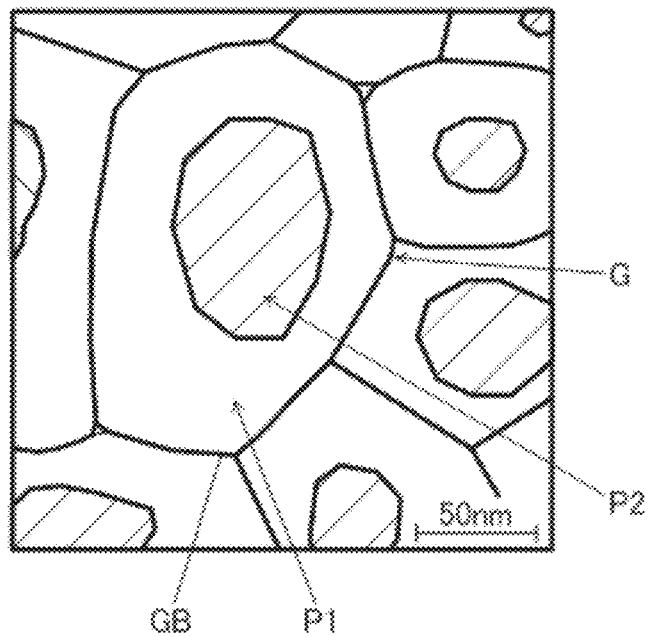
FIG. 3 is a schematic diagram of a transmission electron microscope (which may be abbreviated as a TEM below) observation image in a central region in FIG. 2.
Figure 4:
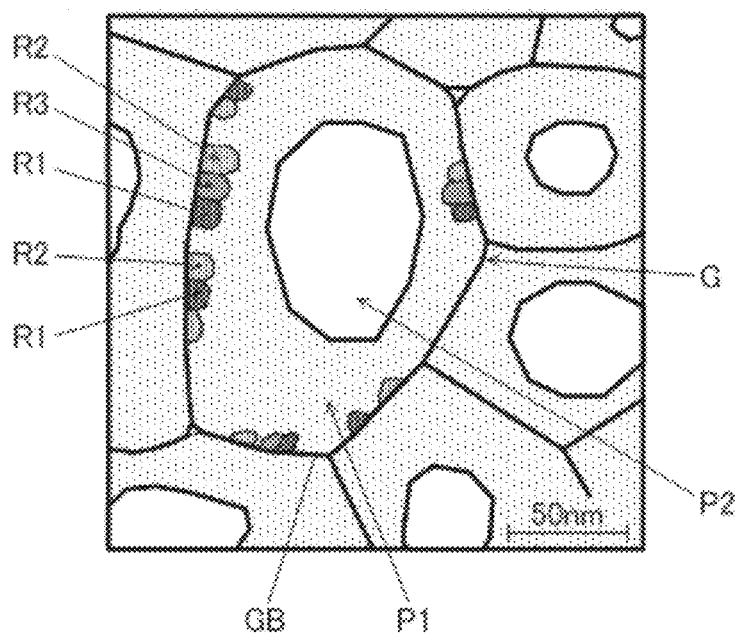
FIG. 4 is a schematic diagram of a result of analysis of distribution of Dy and Ni by energy dispersive X-ray spectroscopy (which may be abbreviated as EDX below) in the region shown in FIG. 3.

FIGS. 3 and 4 show schematic diagrams of a result of TEM observation and element mapping with EDX. FIG. 3 is a schematic diagram of a TEM observation image in the central region in FIG. 2. FIG. 4 is a schematic diagram of a result of analysis of distribution of Dy and Ni by EDX in the region shown in FIG. 3. A center of gravity of a dielectric particle was calculated, an interface of the dielectric particle was connected to the center of gravity with a line, and a region at a molar ratio at least 1.5 times as high as a molar ratio of an element with respect to 100 mol of Ti at a position displaced from the interface on this line segment toward the center of gravity by 40% was defined as a concentrated region. When the molar ratio of the element with respect to 100 mol of Ti on the side of the center of gravity was equal to or lower than a detection limit, a region at a molar ratio at least 1.5 times as high as a value equal to or smaller than the detection limit was defined as the concentrated region. In the present Example, these concentrated regions were located within the dielectric particle as being in contact with the interface. The concentrated region composed of the first element was defined as a first concentrated region R1 and a second concentrated region R2, and the concentrated region composed of the second element was defined as a third concentrated region R3. First concentrated region R1 and second concentrated region R2 were present within 50 nm in a region in contact with the interface.

Third concentrated region R3 may be present between first concentrated region R1 and second concentrated region R2. Third concentrated region R3 is preferably adjacent to first concentrated region R1 and second concentrated region R2. Migration of oxygen vacancy between the dielectric particles can effectively be suppressed by the concentrated regions being adjacent to each other with no gap lying therebetween. A fourth concentrated region composed of an element selected from a first element group and a second element group may further be located between first concentrated region R1 and second concentrated region R2. Therefore, as a line segment along which first concentrated region R1 or second concentrated region R2 in a dielectric particle is in contact with the interface is longer, the concentrated region surrounds the dielectric particle and reliability is improved. Too long a line segment, on the other hand, naturally leads to an increase in area occupied by first concentrated region R1 or second concentrated region R2 in the dielectric particle and a dielectric constant ε disadvantageously lowers.

A thickness of dielectric layer 11 was found by image analysis of a scanning electron microscope (which may be abbreviated as an SEM below) observation image in a central portion of each region on virtual line OL described previously. The thickness of dielectric layer 11 was measured in each region except for a portion where two or more dielectric layers 11 were observed as being connected to each other due to missing of outermost dielectric layer 11 and internal electrode layer 12. An average thickness of dielectric layer 11 was obtained by calculating an arithmetic mean of thicknesses at a plurality of (ten or more) sites in dielectric layer 11. Consequently, the average thickness of dielectric layers 11 was confirmed as being 1.5 μm. The average thickness of dielectric layers 11 is not limited as such, and it is preferably not smaller than 0.3 μm and not larger than 1.5 μm.

A grain boundary GB of a dielectric particle G in the TEM observation image in FIG. 3 was visually determined. An average particle size of dielectric particles G calculated as a median diameter of an equivalent diameter by image analysis of the TEM observation image was 0.13 μm. Grain boundary GB of dielectric particle G is shown also in the schematic diagram of the result of analysis of distribution of Dy and Ni in FIG. 4 for ease in understanding of features of this disclosure.

As shown in FIGS. 3 and 4, a plurality of dielectric particles G can broadly be divided into a first portion P1 located along grain boundary GB of dielectric particle G and a second portion P2 located in a central portion of dielectric particle G.

First portion P1 is a portion where Dy representing first element M1, Ni representing second element M2, and other optionally added additive elements were dissolved as a solid solution in $BaTiO_3$. Second portion P2 is a portion smaller in amount of a solid solution of each element than first portion P1 and close to pure $BaTiO_3$. An amount of Dy and an amount of Ni contained in second portion P2 are preferably equal to or smaller than detection sensitivity of EDX except for background noise. In other words, at least some of the plurality of dielectric particles G have what is called a core-shell structure. Without being limited to the core-shell structure, the first element and the second element may homogenously be distributed.

Dy is dissolved as a solid solution in dielectric particle G as a result of substitution of some of $Ba^{2+}$ in crystal lattices of the $BaTiO_3$-based perovskite compound with $Dy^{3+}$. Ni is dissolved as a solid solution in dielectric particle G as a result of substitution of some of $Ti^{4+}$ in crystal lattices of the $BaTiO_3$-based perovskite compound with $Ni^{2+}$.

As shown in FIG. 4, dielectric particle G containing second element M2 which is a metal element that forms the internal electrode layer (not shown), that is, Ni, includes a plurality of first concentrated regions R1, a plurality of second concentrated regions R2, and a plurality of third concentrated regions R3 located along grain boundary GB. More Dy is unevenly present in first concentrated region R1 and second concentrated region R2 than in third concentrated region R3, and more Ni is unevenly present in third concentrated region R3 than in first concentrated region R1 and second concentrated region R2. Third concentrated region R3 is present between first concentrated region R1 and second concentrated region R2.

Dy and Ni are estimated as being present along grain boundary GB of dielectric particle G in a stable manner owing to the structure above. It is expected that strain is produced in dielectric particle G, for example, due to formation of first concentrated region R1 and second concentrated region R2 where Dy is dissolved as a solid solution at Ba sites of $BaTiO_3$ and third concentrated region R3 where Ni is dissolved as a solid solution at Ti sites. The structure is estimated to be formed for relaxing this strain. A mechanism of formation of the structure above has not yet been understood. One should note that the structure is not dependent on a specific formation mechanism.

As described previously, in order to improve reliability of the multilayer ceramic capacitor including the dielectric layer containing $BaTiO_3$, in addition to intake of a metal element diffused from the internal electrode layer into dielectric particles, migration of the oxygen vacancy in the dielectric layer at the time of application of a DC voltage should be suppressed. In multilayer ceramic capacitor 100 according to this disclosure, the structure is formed along grain boundary GB of dielectric particle G. Therefore, Ni (second element M2) is taken into dielectric particle G in the vicinity of the grain boundary and lowering in insulating resistance is suppressed.

Furthermore, in multilayer ceramic capacitor 100, Dy (first element M1) is distributed in the vicinity of the grain boundary of dielectric particle G. Therefore, it is estimated that a sufficient amount of Ba vacancy has been produced in the vicinity of the grain boundary owing to substitution of $Ba^{2+}$ with $Dy^{3+}$. In other words, many positions stable for oxygen vacancy are present in the vicinity of the grain boundary. Consequently, it is estimated that oxygen vacancy is retained by Ba vacancy within dielectric layer 11 and migration of oxygen vacancy is suppressed. Reliability of multilayer ceramic capacitor 100 can be improved by suppression of lowering in insulating resistance and suppression of migration of oxygen vacancy described above.

<Method of Manufacturing Multilayer Ceramic Capacitor>

A method of manufacturing multilayer ceramic capacitor 100 representing an embodiment of the multilayer ceramic electronic component according to this disclosure will now be described in the order of manufacturing steps. The method of manufacturing multilayer ceramic capacitor 100 includes each step below. A reference provided to a constituent element corresponds to a reference provided to the constituent element shown in FIG. 1.

The method of manufacturing multilayer ceramic capacitor 100 includes a step of obtaining a plurality of ceramic green sheets by further adding an appropriate amount of Si, Mg, and Mn to plasma-treated $BaTiO_3$ powders, blending the powders, and using a Dy compound, Ni powders corresponding to second element M2, and powders (dielectric source material powders) to which a compound of any other additive elements had been attached. Dy corresponds to first element M1 representing rare earth element RE. Examples of rare earth element RE can include Nd, Sm, Eu, Gd, Tb, Dy, Ho, Er, Tm, and Yb.

The term "green" expresses "before sintering" and it is used also in that sense below. The ceramic green sheet contains a binder component other than the dielectric source material powders. The binder component is not particularly limited.

The $BaTiO_3$ powders can be obtained, for example, by calcination of a mixture of $BaCO_3$ powders and $TiO_2$ powders. Alternatively, $BaTiO_3$ powders made by an already known method such as the oxalic method or hydrothermal synthesis may be employed.

The method of manufacturing multilayer ceramic capacitor 100 includes a step of printing an internal electrode layer pattern on a ceramic green sheet with the use of an internal electrode layer paste. The internal electrode layer paste contains Ni powders, powders (common material) in which a compound of various additive elements had been attached to surfaces of $BaTiO_3$ powders, and a binder component.

The common material can be prepared, for example, by attaching an organic compound of various additive elements to surfaces of $BaTiO_3$ powders and calcining the powders to burn organic components such that the additive elements are attached to the surfaces of the $BaTiO_3$ powders as an oxide. Without being limited as such, a state as an organic compound or a state as an oxide and an organic compound being mixed may be acceptable. Without being limited to the $BaTiO_3$ powders, $BaTiO_3$ solid solution powders may be applicable.

In that case, a $BaTiO_3$ solid solution to be used for the ceramic green sheet and a $BaTiO_3$ solid solution to be used for the internal electrode layer paste may be identical to or different from each other in type.

The method of manufacturing multilayer ceramic capacitor 100 includes a step of obtaining a green multilayer body by layering a plurality of ceramic green sheets including the ceramic green sheet having the internal electrode layer pattern formed thereon.

The method of manufacturing multilayer ceramic capacitor 100 includes a step of obtaining multilayer body 10 including a plurality of dielectric layers 11 and a plurality of internal electrode layers 12 that are layered, by sintering the green multilayer body.

It is estimated that lowering in insulating resistance is suppressed in multilayer ceramic capacitor 100 by intake of Ni (second element M2) into dielectric particle G in the vicinity of the grain boundary by employing the $BaTiO_3$ powders, the Dy compound, and the Ni powders corresponding to second element M2 described above and treating the powders with plasma. It is estimated that migration of oxygen vacancy is suppressed because Dy (first element M1) is distributed in the vicinity of grain boundary GB of dielectric particle G and hence a sufficient amount of Ba vacancy is produced in the vicinity of grain boundary GB and oxygen vacancy is retained by Ba vacancy within dielectric layer 11. As shown in Table 1, reliability of multilayer ceramic capacitor 100 can be improved by suppression of lowering in insulating resistance and suppression of migration of oxygen vacancy described above.

Samples in Examples 1 to 18 that are multilayer ceramic capacitors 100 according to the embodiment of the present invention shown in Table 1 below are samples in which first concentrated region R1 and second concentrated region R2 were formed as a result of plasma treatment to take first element M1 into dielectric particle G and third concentrated region R3 was formed as a result of plasma treatment to similarly take second element M2 into dielectric particle G. First concentrated region R1 and second concentrated region R2 are regions at least 1.5 time higher in concentration of first element M1 added in plasma treatment with respect to 100 mol of Ti. Third concentrated region R3 is a region at least 1.5 time higher in concentration of second element M2 added in plasma treatment with respect to 100 mol of Ti. A length of a line segment on the interface in first concentrated region R1 and third concentrated region R3 segregated at the interface of the dielectric particle is shown as an average value of ten lengths.

A mean time to failure which is an indicator in determination as to reliability against load at a high temperature in Table 1 is expressed as an average value of times after which failure occurs due to short-circuiting or deterioration of an insulating resistance at the time of application of a voltage of 6.3 V to ten samples in a high-temperature atmosphere at 120° C. Dielectric constant ε is also expressed as an average value of measurement values of ten samples. Determination in a case where time to failure is equal to or longer than ten concentrated region R3 were present, and an alloy composed of a plurality of elements was present in third concentrated region R3. In Examples 10 to 12, the dielectric layer had a thickness of 0.5 μm and only first concentrated region R1 was present. In Examples 13, 14, and 18, the dielectric layer had a thickness of 0.5 μm and first concentrated region R1 and third concentrated region R3 were present. In Examples 15 to 17, the dielectric layer had a thickness of 0.5 μm, first concentrated region R1 and third concentrated region R3 were present, and an alloy composed of a plurality of elements was present in third concentrated region R3.

Since the concentrated region was present in each Example, the mean time to failure was long. Since the line segment on the boundary was not too long, lowering in dielectric constant ε could also be suppressed. In Comparative Examples 1 and 4, there was no concentrated region. Therefore, in connection with high-temperature reliability, the mean time to failure was shorter than ten hours and evaluation as "x" was given. In Comparative Examples 2, 3, 5, and 6, dielectric constant ε was lowered although time to failure was longer than ten hours, and hence evaluation as "x" was given.

TABLE 1

| | Plasma Treatment | First Element M1 Added in Plasma Treatment | Second Element M2 Added in Plasma Treatment | Thickness of Dielectric Layer (μm) | Line Segment on Interface in R1 (nm) (Concentrated Element) | Line Segment on Interface in R3 (nm) (Concentrated Element) | Time to Failure (hr) | ε | Determination |
|---|---|---|---|---|---|---|---|---|---|
| Comparative Example 1 | No | — | — | 1 | — | — | 5 | 2480 | X |
| Example 1 | Yes | 1.0Dy | — | 1 | 4(Dy) | — | 12 | 2750 | ○ |
| Example 2 | Yes | 3.0Dy | — | 1 | 11 (Dy) | — | 14 | 2600 | ○ |
| Example 3 | Yes | 5.0Dy | — | 1 | 18(Dy) | — | 16 | 2550 | ○ |
| Comparative Example 2 | Yes | 10.0Dy | — | 1 | 29(Dy) | — | 16 | 1850 | X |
| Example 4 | Yes | 1.0Dy | 0.5Ni | 1 | 4(Dy) | 5(Ni) | 32 | 2520 | ◎ |
| Example 5 | Yes | 3.0Dy | 1.5Ni | 1 | 12(Dy) | 13(Ni) | 34 | 2490 | ◎ |
| Example 6 | Yes | 3.0Dy | 1.0Ni, 0.3Sn | 1 | 13(Dy) | 8(Ni + Sn) | 70 | 2343 | ◎ |
| Example 7 | Yes | 3.0Dy | 1.0Ni, 0.5Sn | 1 | 12(Dy) | 15(Ni + Sn) | 71 | 2340 | ◎ |
| Example 8 | Yes | 3.0Dy | 1.0Ni, 0.7Sn | 1 | 14(Dy) | 17(Ni + Sn) | 72 | 2338 | ◎ |
| Example 9 | Yes | 5.0Dy | 2.5Ni | 1 | 18(Dy) | 19(Ni) | 40 | 2450 | ◎ |
| Comparative Example 3 | Yes | 10.0Dy | 5.0Ni | 1 | 25(Dy) | 24(Ni) | 12 | 1710 | X |
| Comparative Example 4 | No | — | — | 0.5 | — | — | 3 | 2210 | X |
| Example 10 | Yes | 1.0Dy | — | 0.5 | 5(Dy) | — | 23 | 2300 | ○ |
| Example 11 | Yes | 3.0Dy | — | 0.5 | 12(Dy) | — | 25 | 2230 | ○ |
| Example 12 | Yes | 5.0Dy | — | 0.5 | 20(Dy) | — | 28 | 2060 | ○ |
| Comparative Example 5 | Yes | 10.0Dy | — | 0.5 | 29(Dy) | — | 30 | 1720 | X |
| Example 13 | Yes | 1.0Dy | 0.5Ni | 0.5 | 4(Dy) | 6(Ni) | 41 | 2320 | ◎ |
| Example 14 | Yes | 3.0Dy | 1.5Ni | 0.5 | 13(Dy) | 14(Ni) | 44 | 2270 | ◎ |
| Example 15 | Yes | 3.0Dy | 1.0Ni, 0.3Sn | 0.5 | 12(Dy) | 7(Ni + Sn) | 80 | 2197 | ◎ |
| Example 16 | Yes | 3.0Dy | 1.0Ni, 0.5Sn | 0.5 | 12(Dy) | 14(Ni + Sn) | 82 | 2200 | ◎ |
| Example 17 | Yes | 3.0Dy | 1.0Ni, 0.7Sn | 0.5 | 11 (Dy) | 16(Ni + Sn) | 94 | 2201 | ◎ |
| Example 18 | Yes | 5.0Dy | 2.5Ni | 0.5 | 19(Dy) | 19(Ni) | 48 | 2080 | ◎ |
| Comparative Example 6 | Yes | 10.0Dy | 5.0Ni | 0.5 | 26(Dy) | 25(Ni) | 50 | 1670 | X | hours and dielectric constant ε is equal to or larger than 2000 is shown with a circle. In particular, determination in a case where time to failure exceeds thirty hours is shown with a double circle. Determination in a case where time to failure is equal to or shorter than ten hours and dielectric constant ε is smaller than 2000 is shown with "x". As will be described later, a sample for which determination shown with "x" was made corresponds to a Comparative Example.

As shown in Table 1, in Examples 1 to 3, the dielectric layer had a thickness of 1.0 μm and only first concentrated region R1 was present. In Examples 4, 5, and 9, the dielectric layer had a thickness of 1.0 μm and first concentrated region R1 and third concentrated region R3 were present. In Examples 6 to 8, the dielectric layer had a thickness of 1.0 μm, first concentrated region R1 and third The embodiment disclosed herein is illustrative and the invention according to this disclosure is not limited to the embodiment. The scope of the invention according to this disclosure is defined by the terms of the claims and is intended to include any modifications within the scope and meaning equivalent to the terms of the claims. Various applications and modifications can be made within the scope above.

For example, the number of dielectric layers and internal electrode layers that form the multilayer body and a material for the dielectric layers and the internal electrode layers can variously be applied or modified within the scope of this invention. Though the multilayer ceramic capacitor is illustrated as the multilayer ceramic electronic component, the invention according to this disclosure is not limited thereto and the invention is applicable also to a capacitor element formed in the inside of a multilayer substrate.

What is claimed is:

1. A multilayer ceramic electronic component comprising:
   a multilayer body including a dielectric layer and an internal electrode layer that are layered,
   the dielectric layer containing a plurality of dielectric particles, the plurality of dielectric particles containing: Ba and Ti,
   a first concentrated region containing a first element, at least a part of the first concentrated region being located at an interface with an adjacent dielectric particle of the plurality of dielectric particles, and a length of a line segment on the interface of first concentrated region with the adjacent dielectric particle is 4 nm to 20 nm, and
   a second concentrated region containing the first element and present at an interface within 50 nm from the first concentrated region.

2. A multilayer ceramic electronic component comprising:
   a multilayer body including a dielectric layer and an internal electrode layer that are layered,
   the dielectric layer containing a plurality of dielectric particles, the plurality of dielectric particles containing: Ba and Ti,
   a first concentrated region containing a first element and located at an interface with an adjacent dielectric particle of the plurality of dielectric particles, and
   a second concentrated region containing the first element and present at an interface within 50 nm from the first concentrated region,
   wherein the plurality of dielectric particles contain a third concentrated region composed of a second element and present between the first concentrated region and the second concentrated region.

3. The multilayer ceramic electronic component according to claim 2, wherein the third concentrated region is adjacent to the first concentrated region and the second concentrated region.

4. The multilayer ceramic electronic component according to claim 2, wherein more of the first element in present in the first concentrated region and the second concentrated region than in the third concentrated region, and more of the second element is present in the third concentrated region than in the first concentrated region and the second concentrated region.

5. The multilayer ceramic electronic component according to claim 2, wherein the first concentrated region and the third concentrated region are adjacent to each other.

6. The multilayer ceramic electronic component according to claim 1, wherein the first element includes at least one rare earth element.

7. The multilayer ceramic electronic component according to claim 2, wherein the second element includes at least one metal selected from Ni, Cu, Pd, and Ag.

8. The multilayer ceramic electronic component according to claim 1, wherein the internal electrode layer contains a second element.

9. A multilayer ceramic electronic component comprising:
   a multilayer body including a dielectric layer and an internal electrode layer that are layered,
   the dielectric layer containing a plurality of dielectric particles, the plurality of dielectric particles containing: Ba and Ti,
   a first concentrated region containing a first element and located at an interface with an adjacent dielectric particle of the plurality of dielectric particles, and
   a second concentrated region containing the first element and present at an interface within 50 nm from the first concentrated region,
   wherein the internal electrode layer contains a second element, and
   wherein the dielectric layer contains a third concentrated region composed of the second element and present between the first concentrated region and the second concentrated region.

10. The multilayer ceramic electronic component according to claim 9, wherein the third concentrated region is adjacent to the first concentrated region and the second concentrated region.

11. The multilayer ceramic electronic component according to claim 9, wherein more of the first element in present in the first concentrated region and the second concentrated region than in the third concentrated region, and more of the second element is present in the third concentrated region than in the first concentrated region and the second concentrated region.

12. The multilayer ceramic electronic component according to claim 9, wherein the first concentrated region and the third concentrated region are adjacent to each other.

13. The multilayer ceramic electronic component according to claim 9, wherein the first element includes at least one rare earth element.

14. The multilayer ceramic electronic component according to claim 9, wherein the second element includes at least one metal selected from Ni, Cu, Pd, and Ag.

15. The multilayer ceramic electronic component according to claim 1, wherein the dielectric particles have a core-shell structure including a core and a shell.

16. The multilayer ceramic electronic component according to claim 1, wherein the dielectric layer has a thickness not smaller than 0.3 μm and not larger than 1.5 μm.

* * * * *